United States Patent
O'Toole et al.

(10) Patent No.: US 12,111,084 B2
(45) Date of Patent: Oct. 8, 2024

(54) SYSTEM AND METHOD FOR SUPPORTING SMA MATERIAL AND OPTIMISING HEAT TRANSFER IN A SMA HEAT PUMP

(71) Applicant: EXERGYN LTD., Dublin (IE)

(72) Inventors: Kevin O'Toole, Dublin (IE); Michael Langan, Dublin (IE); Matthieu Morhan, Dublin (IE); Richard Blackburn, Dublin (IE)

(73) Assignee: EXERGYN LTD., Dublin (IE)

( * ) Notice: Subject to any disclaimer, the term of this patent is extended or adjusted under 35 U.S.C. 154(b) by 249 days.

(21) Appl. No.: 17/632,137

(22) PCT Filed: Aug. 1, 2020

(86) PCT No.: PCT/EP2020/071748
§ 371 (c)(1),
(2) Date: Feb. 1, 2022

(87) PCT Pub. No.: WO2021/023682
PCT Pub. Date: Feb. 11, 2021

(65) Prior Publication Data
US 2022/0275981 A1   Sep. 1, 2022

(30) Foreign Application Priority Data

Aug. 2, 2019 (GB) .................................. 1911093

(51) Int. Cl.
*F25B 30/02* (2006.01)
*F25B 23/00* (2006.01)
*F03G 7/06* (2006.01)

(52) U.S. Cl.
CPC .............. *F25B 30/02* (2013.01); *F25B 23/00* (2013.01); *F03G 7/0614* (2021.08); *F03G 7/0646* (2021.08)

(58) Field of Classification Search
CPC .......... F25B 30/02; F25B 30/00; F25B 23/00; F03G 7/0614; F03G 7/0646; F03G 7/062
See application file for complete search history.

(56) References Cited

U.S. PATENT DOCUMENTS

| 4,353,218 | A | 10/1982 | Wheatley et al. |
| 10,018,385 | B2 | 7/2018 | Radermacher et al. |

(Continued)

FOREIGN PATENT DOCUMENTS

| CN | 106052190 A | * 10/2016 | .............. F25B 29/00 |
| CN | 107289668 A | 10/2017 | |

(Continued)

OTHER PUBLICATIONS

Machine English language translation of JP 2015068604 to Daikin Ind Ltd (translated Sep. 2023) (Year: 2015).

(Continued)

*Primary Examiner* — Emmanuel E Duke
(74) *Attorney, Agent, or Firm* — Nixon Peabody LLP

(57) ABSTRACT

The invention provides heat pump system a Shape-Memory Alloy (SMA) or Negative Thermal Expansion (NTE) or elastocaloric material core positioned in a housing and adapted to absorb thermal heat and store energy in response to a first fluid inputted at a first temperature. The housing is configured to receive the fluid at the first temperature via an inlet to cause the SMA or NTE or elastocaloric material core to change state. A device is configured to apply stress on the SMA or NTE or elastocaloric core in the housing to cause the SMA or NTE or elastocaloric core to change state. A support system is configured to engage with the material in the core to prevent the material buckling when the stress is applied wherein the support system comprises a series of buckling supports positioned along at least one length of the SMA or NTE or elastocaloric material core. The support system provides a mechanical buckling support and heat (Continued)

transfer optimisation for fluid flow in a SMA heat pump during compression.

11 Claims, 4 Drawing Sheets

(56) References Cited

U.S. PATENT DOCUMENTS

| | | | |
|---|---|---|---|
| 10,119,059 | B2 | 11/2018 | Cui et al. |
| 11,454,429 | B2 | 9/2022 | Bartholome et al. |
| 11,656,008 | B2 | 5/2023 | Langan et al. |
| 2012/0273158 | A1* | 11/2012 | Cui .................... F03G 7/0614 165/10 |
| 2016/0084544 | A1* | 3/2016 | Radermacher .......... C09K 5/14 62/304 |
| 2016/0208783 | A1 | 7/2016 | Cullen et al. |
| 2019/0032969 | A1* | 1/2019 | Bartholome ............ F03G 7/062 |
| 2022/0299243 | A1 | 9/2022 | O'Toole et al. |

FOREIGN PATENT DOCUMENTS

| | | | | |
|---|---|---|---|---|
| CN | 107421096 A | | 12/2017 | |
| EP | 3317535 B1 | | 5/2018 | |
| GB | 2497542 A | | 6/2013 | |
| GB | 2533357 A | * | 6/2016 | ............ F03G 7/065 |
| JP | 2015068604 | | 4/2015 | |
| WO | WO-2014198904 A1 | * | 12/2014 | ............ F03G 7/065 |
| WO | WO-2014198934 A2 | * | 12/2014 | ............ F03G 7/065 |
| WO | WO-2017001521 A1 | * | 1/2017 | ............ F03G 7/065 |
| WO | WO-2018229231 A1 | * | 12/2018 | |

OTHER PUBLICATIONS

Machine English language translation of CN 106052190 B to Xi'an Jiaotong Univ (Year: 2016).

* cited by examiner

SYSTEM AND METHOD FOR SUPPORTING SMA MATERIAL AND OPTIMISING HEAT TRANSFER IN A SMA HEAT PUMP

CROSS-REFERENCE TO RELATED APPLICATIONS

This application is a 35 U.S.C. § 371 National Phase Entry Application of International Application No. PCT/EP2020/071748 filed Aug. 1, 2020, which designates the U.S. and claims benefit under 35 U.S.C. § 119(a) of GB Application No. 1911093.1 filed Aug. 2, 2019, the contents of which are incorporated herein by reference in their entireties.

FIELD

This disclosure relates to a heat pump. In particular this disclosure relates to a heat pump for heating systems and/or cooling systems such as an air conditioning system.

BACKGROUND

Heat Pump ("HP") technologies have gained wide commercial acceptance in heating, ventilation & air conditioning ("HVAC") applications. They can offer energy savings and emissions reductions and are typically installed for heating and cooling systems in buildings or car applications etc.

There are several types of heat pump. Most existing technologies utilise a refrigerant in expansion/compression cycles, many heat pumps are classified by the source of the heat e.g. air source heat pump or ground source heat pump. The fundamental technology used in the heat pump is similar. Air source heat pumps have limited performance in cold temperature (at −18° C., CoP tends to be around 1 (due to Carnot) so electrical resistance heating is more effective, at higher operating temperatures the CoP can reach 4). Ground Source heat pumps have more stable inlet temperature but are limited by the Coefficient of Performance ("CoP") of present technology.

There is a global need to decarbonise heating and cooling in buildings. Heating generally uses combustion of carbon-based fuel, which releases carbon into the atmosphere. Cooling and air conditioning can be a major electrical load in warmer climates. Heat pumps can potentially deliver heating and cooling from a single package. If a heat pump uses renewable electricity, then it can be a zero-emission technology. Current heat pump technologies generally use refrigerants with high global warming potential and can have high toxicity, which is undesirable. Fans and pumps have a noise signature which can be intrusive. Current HP technology has a CoP of 3 to 4. By increasing the CoP, electricity consumption can be reduced, this reduces carbon emissions if non-renewable electricity is used. Moreover, conventional HP technologies can have a CoP which is affected by ambient air temperature which is undesirable. US Patent publication number US20160084544, Radermacher et al, discloses a heat pump system that uses SMA material tubes, where the are filled with other tubes or rods of an unknown material to take up volume and to therefore remove dead thermal mass to help boost the efficiency of the system. Chinese patent publication number CN 106052190 (Qian et al) discloses a thermoelastic refrigeration system comprising first and second memory alloys and a frame defining a structural member for transmitting a loading force.

However, a problem with this configuration is that they are thermally inefficient and do not expand and/or contract uniformly and the CoP values generated are poor. In addition the SMA material is prone to buckling leading to the heat pump system to fail. One method to increase the buckling length of the SMA material is to increase the diameter of the SMA rod in compression. However, in doing so, the surface area to volume ratio increases, resulting in a reduction in the rate of heat transfer, and ultimately the deltaT achievable for a fixed flow rate.

It is therefore an object to produce a heat pump system that increases the life time of a core material. It is another object to provide heat transfer optimisation in a heat pump.

SUMMARY

According to the invention there is provided, as set out in the appended claims, heat pump system comprising
 a Shape-Memory Alloy (SMA) or Negative Thermal Expansion (NTE) or elastocaloric material core positioned in a housing and adapted to absorb heat and store thermal energy in response to a first fluid inputted at a first temperature;
 the housing is configured to receive the fluid at the first temperature via an inlet to cause the first SMA or NTE or elastocaloric core to change state;
 a device is configured to apply stress on the first SMA or NTE core in the housing to cause the SMA or NTE or elastocaloric core to change state characterised in that a support system is configured to engage with the SMA material to prevent the SMA material buckling when a stress is applied.

The support system provides a SMA/NTE/elastocaloric buckling support and heat transfer optimisation between the SMA/NTE/elastocaloric core and the fluid flow in a heat pump during compression, tension or torsion.

In one embodiment the stress applied is a compression stress.

In one embodiment the core comprises at least one SMA/NTE/elastocaloric rod and adapted to engage with the support system.

In one embodiment the core comprises at least one of plate/crenelated/roughness/screwtheread/sawtooth SMA material.

In one embodiment the support system comprises a plurality of supports configured to engage the SMA or NTE or elastocaloric core along at least one length at a plurality of points and adapted to generate turbulence in the fluid during use.

In one embodiment the support system comprises a plurality of supports and a turbulence generator.

In one embodiment a plurality of elements are positioned on an internal surface of the housing.

In one embodiment a plurality of elements are positioned on the outside surface of the SMA or NTE or elastocaloric core.

In one embodiment the SMA or NTE or elastocaloric core comprises a hollow core and a plurality of elements are positioned on the inside surface of the hollow SMA core.

In one embodiment the element comprises a spring or helical coil element.

It will be appreciated that the core can comprise any suitable elastocaloric material such as Nickel Titanium alloy or derivatives NiTiX or NiTiXY where X & Y are tertiary/quaternary alloying elements, NiMnGa CuAlZn.

In one embodiment there is provided a heat pump system comprising
- a Shape-Memory Alloy (SMA) or Negative Thermal Expansion (NTE) or elastocaloric material core positioned in a housing and adapted to absorb thermal heat and store energy in response to a first fluid inputted at a first temperature;
- the housing is configured to receive the fluid at the first temperature via an inlet to cause the SMA or NTE or elastocaloric material core to change state;
- a device is configured to apply stress on the SMA or NTE or elastocaloric core in the housing to cause the SMA or NTE or elastocaloric core to change state; and
- a support system is configured to engage with the material in the core to prevent the material buckling when the stress is applied wherein the support system comprises a series of buckling supports positioned along at least one length of the SMA or NTE or elastocaloric material core.

In another embodiment there is provided a cooling/refrigeration system comprising:
- a Shape-Memory Alloy (SMA) or Negative Thermal Expansion (NTE) or elastocaloric material core positioned in a housing and adapted to absorb thermal heat and store energy in response to a first fluid inputted at a first temperature;
- the housing is configured to receive the fluid at the first temperature via an inlet to cause the SMA or NTE or elastocaloric material core to change state;
- a device is configured to apply stress on the SMA or NTE or elastocaloric core in the housing to cause the SMA or NTE or elastocaloric core to change state; and
- a support system is configured to engage with the material in the core to prevent the material buckling when the stress is applied wherein the support system comprises a series of buckling supports positioned along at least one length of the SMA or NTE or elastocaloric material core.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
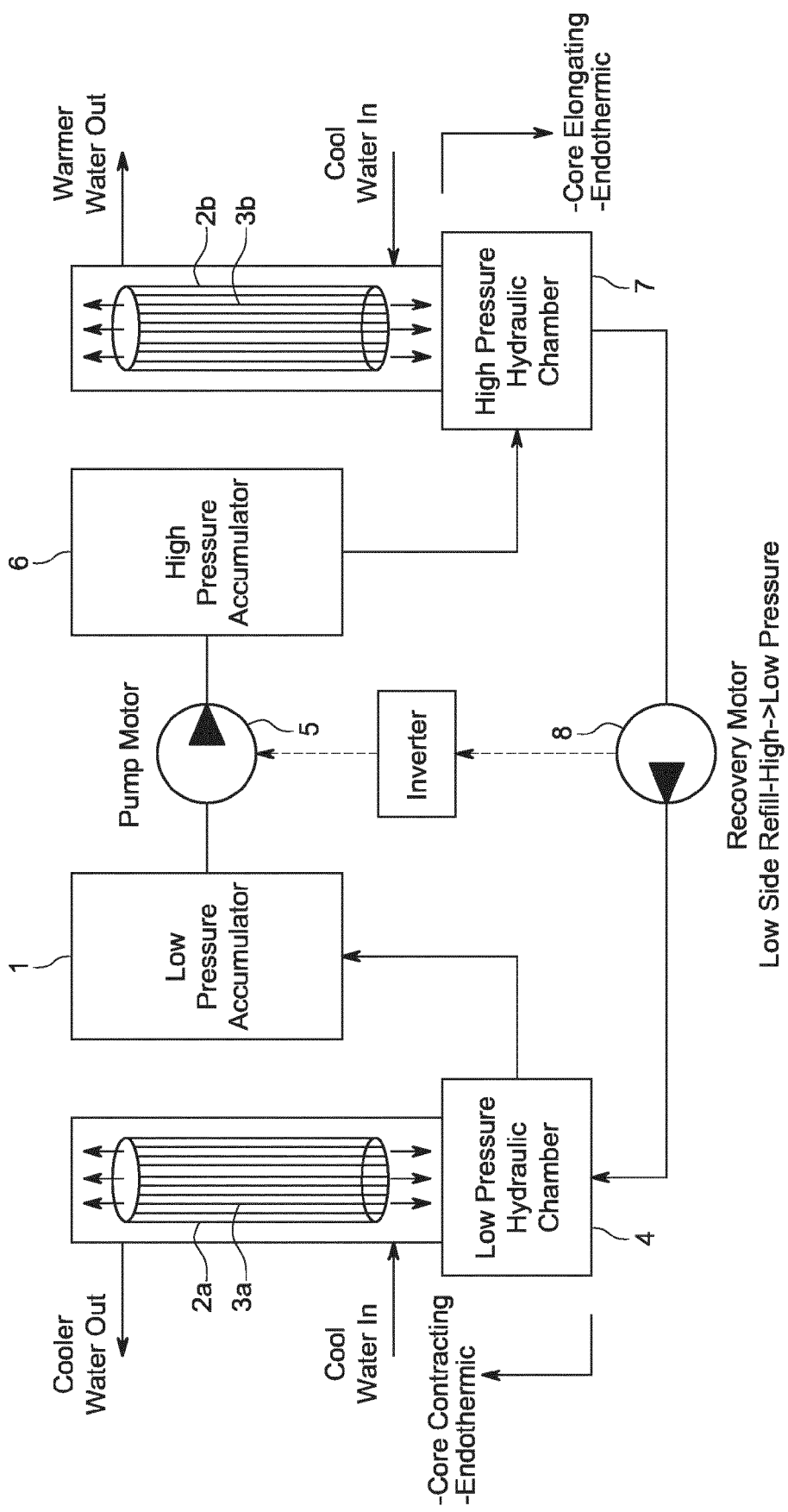
FIG. 1 illustrates a Heat Pump system incorporating a mechanical configuration of SMA or NTE or elastocaloric cores and a transmission system.

The invention relates to a new heat pump cycle which utilises the latent heat from a phase transformation of shape memory alloys ("SMA") or Negative Thermal Expansion materials (NTE) or elastocaloric materials. The following description of a preferred embodiment of the invention describes a SMA implementation and equally applies to Negative Thermal Expansion materials (NTE) or elastocaloric material implementations.

The invention can use a particular SMA engine made up of a plurality of elements or wires packed closely together to define a core. SMA material can exist in two crystalline states, martensite and austenite, and can be reversibly converted from one phase to the other. The austenite to martensite transition of SMA is exothermic. The martensite to austenite transition is endothermic. The temperatures at which the phase change occurs can be manipulated via the application of stress to the SMA material.

A Shape-memory Alloy (SMA) is an alloy that exhibits a shape memory effect which once deformed returns to its pre-deformed shape upon heating. This material is a solid-state alternative to conventional actuators such as hydraulic, pneumatic, and motor-based systems.

The invention relates to a heat pump system and method which can use either Shape-Memory Alloys (SMAs) or Negative Thermal Expansion materials (NTE) or elastocaloric material. In one embodiment a particular SMA system made up of SMA material can be used. For example a plurality of elements (or a plurality of groups of elements) or wires packed closely together to define a core. In another example the core can be made up of one or more of the following rod, block, ribbon, strip or plates, 3D printed elements and the like all capable of being subjected to compression, axially or laterally, compression and natural loading, torsional stress to function as a core.

A heat pump has two individual phases—heat absorption and heat release. The machine cycle is defined as a full heat absorption phase (endothermic) and a full heat release phase (exothermic).

The heat absorption phase allows for the transfer of heat into the SMA material by setting the stress applied to the material to an appropriate value, the lower value used in the cycle of operation. This results in the activation temperatures, Austenite start ($A_s$) and Austenite finish ($A_f$), being set to a value below the input temperature of fluid stream. The thermal gradient present therefore allows the heat to transfer into the SMA via conduction and convection from the fluid stream. Once the material has fully or partially transformed to austenite (i.e. the temperature of the SMA material is equal or above $A_f$), the heat absorption phase is complete.

The heat release phase begins after increasing the stress on the austenitic SMA material. This raises the activation temperatures, Martensite start ($M_s$) and Martensite finish ($M_f$), for the reverse transformation back to martensite. Once the value of $M_s$ is raised above the input fluid stream temperature (the fluid stream can be the same as the heat absorption phase or one at a higher temperature in a heat pump configuration), the reverse transformation begins. It will only complete in full when $M_f$ also raised above the fluid stream temperature. The latent heat is then released into the material, causing it to increase in temperature, creating a thermal gradient between the SMA material and the fluid stream. Energy/heat is then transferred into the fluid, raising its temperature. The rate at which the release of heat occurs is a function of the thermal gradient and various thermodynamic conditions of the fluid stream, such as flow rate, turbulence etc.

A single fluid temperature input can be used in the system, and a series of valves can be used at the output of the chamber to direct the colder fluid flow from the heat absorption phase back to source, while directing the warmer fluid from the heat release phase to the heating target. Multiple working fluid temperature inputs can also be used. A system designed to cool would operate the same cycle, however, the performance focus would be on the cool stream output compared to the hot stream for a heat pump configuration.

Figure 2:
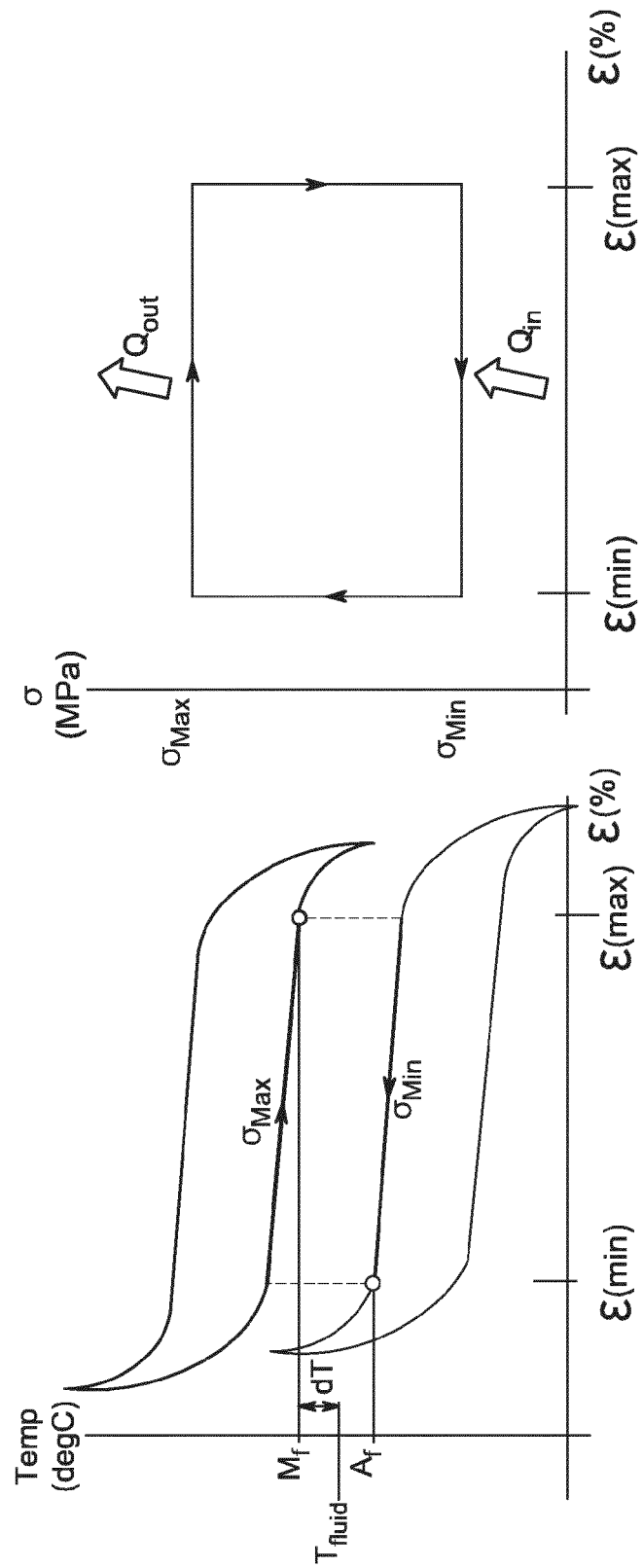
FIG. 2 illustrates a work flow diagram showing different states of the heat pump during operation.

FIG. 1 illustrates a heat pump system incorporating a known SMA drive system operated in reverse and described in unpublished PCT patent application number PCT/EP2019/052300, assigned to Exergyn Limited, and fully incorporated herein by reference. As shown in FIG. 1 a low-pressure accumulator pressure 1 is applied to a SMA core 2a or bundle in a martensite state. Fluid is input into a chamber housing the SMA core 2a which is at a higher temperature than the $A_s$ and $A_f$ therefore allowing the SMA material to absorb the heat. FIG. 2 illustrates a workflow diagram showing different states of the SMA drive during operation. As a result of a low-pressure applied (and hence low stress) on the wires, both the Austenite start ($A_s$) and Austenite finish ($A_f$) temperatures are lowered proportionally, making a full martensite to austenite transformation easier to achieve with the lower input fluid temperature. The SMA wires in the core are heated to point $A_f$, as shown in FIG. 2. $A_f$ is the point of maximum contraction of the wire by design—representing a partial or full martensite to austenite transformation.

First Embodiment

In a SMA heat pump in compression, buckling of the SMA core is a problem that must be addressed. One way to overcome buckling is to increase the diameter of the SMA rod in compression. However, in doing so, the surface area to volume ratio increases, resulting in a reduction in the rate of heat transfer, and ultimately the deltaT achievable for a fixed flow rate.

Figure 3:
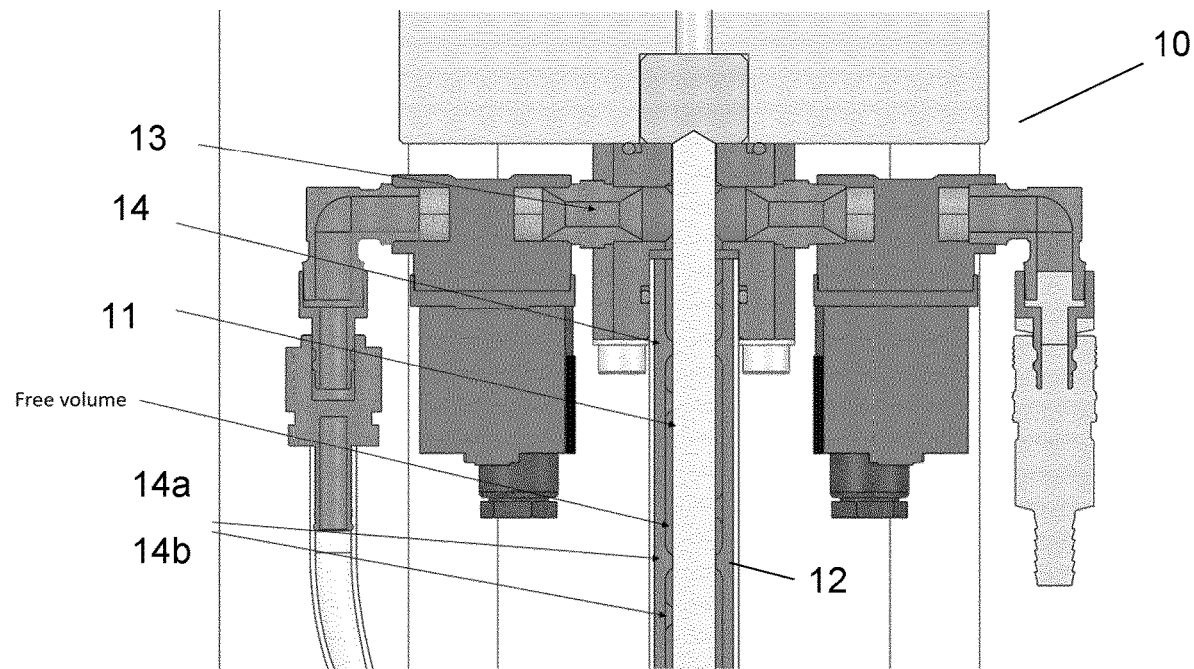
FIG. 3 illustrates an embodiment of the present invention showing a first SMA core in the form of a SMA or NTE or elastocaloric rod supported by a support system.

Referring to FIG. 3 there is shown an enlarged view of part of a heat pump system indicated generally by the reference numeral 10 comprising a Shape-Memory Alloy (SMA) or Negative Thermal Expansion (NTE) or elastocaloric material core 11. In the embodiment shown the core 11 is a single rod of SMA material. It will be appreciated that the core can be a plurality of rods. The SMA rods may also be replaced by SMA ribbon, SMA strip or SMA plates and the like in compression.

The core 11 is positioned in a housing 12 and adapted to absorb heat and store energy in response to a first fluid inputted at a first temperature. The housing 12 is configured to receive the fluid at the first temperature via an inlet 13 to cause the first SMA or NTE core to change state. A device or mechanism is configured to apply stress on the first SMA or NTE core in the housing to cause the SMA or NTE core to change state. The stressing of the core can be provided by a hydraulic circuit, pneumatic, electromechanical or screw thread device arrangement configured to apply a stress to the core. In order to prevent buckling or damage of the SMA core 11 a support system 14 is configured to engage with the SMA material to prevent the SMA material buckling when a stress is applied.

The support system 14 provides both mechanical buckling support and heat transfer optimisation for fluid flow in a heat pump during compression. As shown in FIG. 3 the support 14 is designed and optimised with a series of buckling supports 14a, 14b running along the length of the SMA rod 11 which, at the same time, creates a turbulent fluid flow through the fluid chamber housing 12 that in effect increases the rate of heat transfer between the SMA rod 11 and the flowing fluid, and subsequently increase the power output of the system. A favourable balance between the increased pumping cost against the increased rate of heat transfer can be found where the coefficient of performance is increased.

The buckling support system 14 can be fitted around the outside of a single or multiple SMA rods in compression and can be optimised to suit different fluid flow scenarios. As such, a design can be chosen for the optimum diameter rod in compression in the full knowledge that it will not buckle and the rate of heat transfer (and therefore Qout) will be maximised.

The support system 14, which also generates turbulence, solves the problem of laminar steady flow which is detrimental to optimal heat transfer from a heat source to a fluid. By optimising the design of each of the components described the system optimises the heat transfer which improves the performance and energy output of this heat pump in compression. The support system 14 simultaneously solves compression buckling issues allowing for longer compression rods to be used, which in turn decreases the manufacturing cost of the system and system complexity allowing for a longer lifetime of the heat pump system.

Second Embodiment

As indicated with respect to FIG. 3 the ideal solid state heat pump SMA geometry for SMA rods or tubes acting in compression from a mechanical perspective would be one with large rod/tube diameters in order to increase the buckling length of the rod. However, from a thermodynamic design, large diameters result in significant reductions to the rate of heat transfer, reducing Qout or the deltaT achievable.

In order to improve performance, in certain applications, a number of modifications/additions can be made to the SMA rods/tubes in order to enhance the rate of heat transfer in and out, which is beneficial to the SMA heat pump system.

Figure 4:
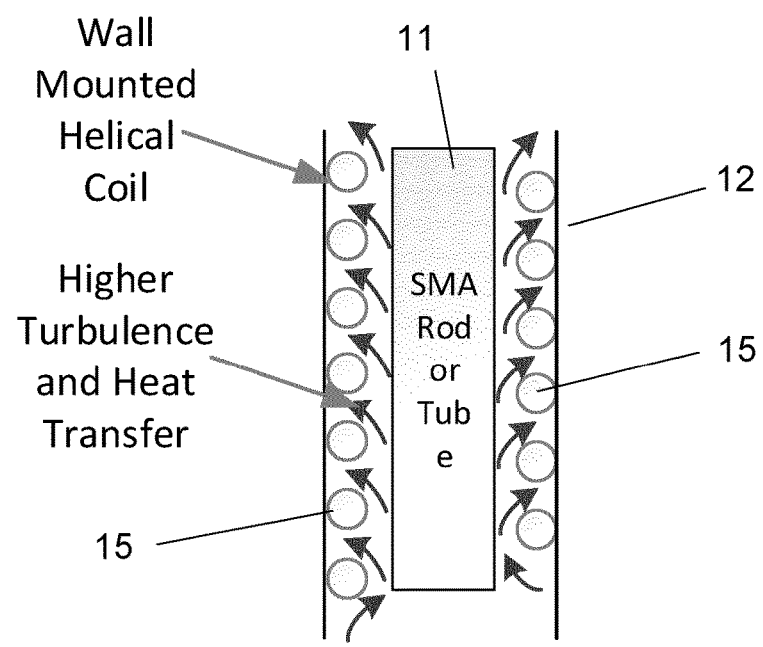
FIG. 4 illustrates a SMA or NTE or elastocaloric rod or tube in a core where a number of elements are placed on the wall of a housing, housing the SMA core.

FIG. 4 illustrates a SMA rod or tube in a core 11 where a number of elements 15 are placed on the wall of a housing, housing the SMA core. In one embodiment a number or protrusions or elements 15 are positioned on the inner surface of the housing chamber 12. The elements 15 can be wall mounted helical springs of coils. The function of the elements 15 is to promote and ensure higher turbulence and heat transfer occurs when fluid enters the chamber 12. In one embodiment the inner surface of the chamber 12 is roughened to increase turbulence.

Figure 5:
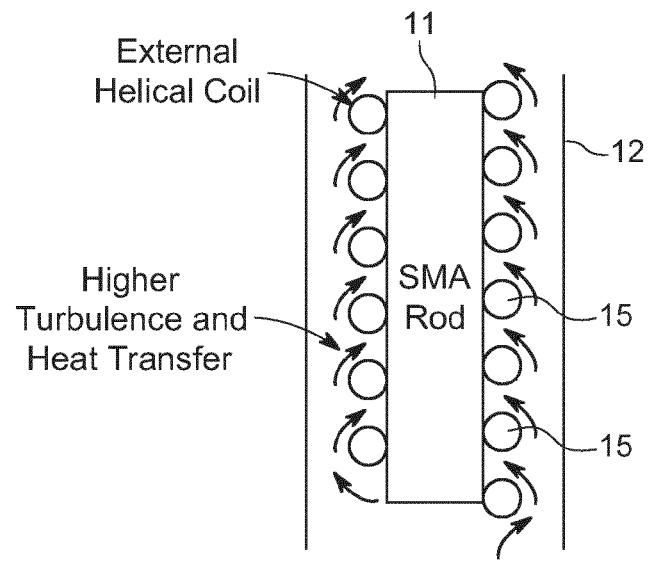
FIG. 5 illustrates a rod or tube in a core where a number of elements are placed on the outer surface of the rod or tube.

FIG. 5 illustrates a SMA rod or tube 11 in a core where a number of elements 15 are placed on the surface of the SMA core 11. In the embodiment shown the core 11 is a SMA rod. Placing a spring or similar helical unit over the SMA rod, results in local turbulence around the spring or element material 15.

Figure 6:
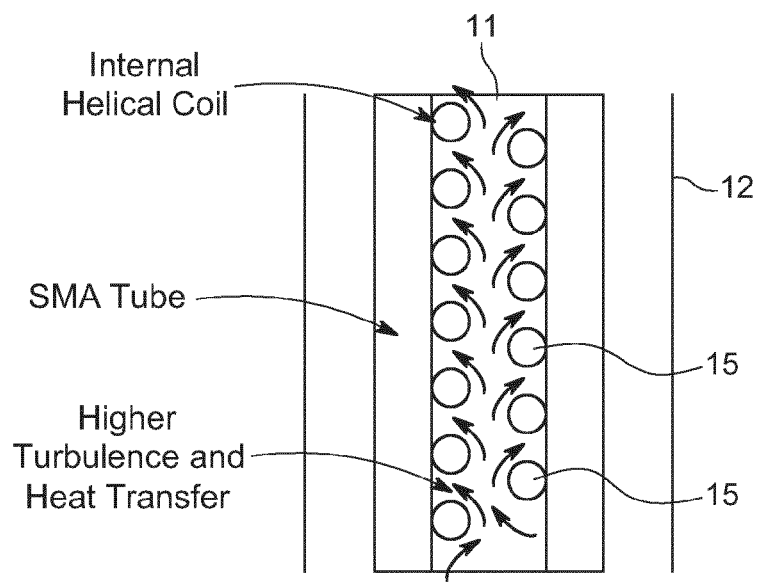
FIG. 6 illustrates a hollow or partially hollow rod or tube in a core where a number of elements are placed on the inner wall of a core.

FIG. 6 illustrates a SMA hollow rod or tube 11 in a core where a number of elements 15 are placed on the inner surface of the hollow SMA core 11. Placing a spring or similar helical unit on the inside of a SMA tube 11 which will result in an increase in turbulence in the centre of hollow rod or tube 11.

The basic principle of the embodiments described in FIGS. 4, 5 and 6 is to create additional turbulence in the fluid local to the core material. This increased turbulence results in an increased Reynolds number and therefore, an increase in the rate of heat transfer. This can be achieved by increasing the turbulence of the fluid in the chamber.

This invention demonstrates how to increase the rate of heat transfer in and out of larger SMA rods, enabling their selection in compression core type architectures for SMA heat pumps. The selection makes it easier to build and stabilise larger cores in compressions whilst not compromising on power/heat output and efficiency.

Third Embodiment

Energy (heat) extraction or input to or from an SMA element in a SMA core as hereinbefore described is fundamental to performance and efficiency of the overall system. The fluid and SMA have to be at different temperatures to enable energy transfer. This is a complicated problem, and some of the key parameters are the temperature delta between the fluid surface and SMA surface, SMA surface to core distance, SMA bundle architecture if multiple elements are used, and fluid flow characteristics, particularly flow rate/velocity.

When temperature deltas and therefore available energy for transfer are high, the transfer can take place at a faster rate. With low temperature delta the energy transfer will take place at a slower rate.

A problem to overcome is that with a constant flow rate/temperature of fluid into a type two core system, the outlet temperature during a cycle is not dissimilar to a gumbel shape curve plotting temperature against time. This is not optimum in terms of maintaining the highest possible temperature, as only the peak area of the graph produces this higher temperature. The other majority of flow mass/volume is at a sub-optimum temperature.

Most of the parameters mentioned are fixed and therefore cannot be dynamically adjusted during a cycle. Flow rate (=velocity) can be varied. By dynamically controlling the flow rate during the cycle, for instance a high flow rate when the delta-T is high, and dropping the flow rate off at lower delta-T values, will result in an overall reduction in mass flow out of the system, but that average temperature in the flow will be higher. The total energy should not change. This higher average temperature flow at a lower mass/volume is of more value to an end user than a higher mass at a lower temperature change.

The heat pump system and method as described herein has many applications and can be used in heating (space heating, heat boilers systems or hot water); cooling (air conditioning water coolers, process cooling), reversible heating and cooling (in buildings or in automotive application); refrigeration (domestic and commercial/retail) cryogenic cooling. The heat pump system and method can effectively be applied to any heating or cooling system.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A heat pump system comprising
a Shape-Memory Alloy (SMA) or Negative Thermal Expansion (NTE) or elastocaloric material core positioned in a housing and adapted to absorb thermal heat and store energy in response to a first fluid inputted at a first temperature;
the housing is configured to receive the fluid at the first temperature via an inlet to cause the SMA or NTE or elastocaloric material core to change state;
a device is configured to apply stress on the SMA or NTE or elastocaloric core in the housing to cause the SMA or NTE or elastocaloric core to change state; and
a support system is configured to engage with the material in the core to prevent the material buckling when the stress is applied wherein the support system comprises a series of buckling supports positioned along at least one length of the SMA or NTE or elastocaloric material core.

2. The heat pump system of claim 1 wherein the stress applied is a compression stress.

3. The heat pump system as claimed in claim 1 wherein the core material comprises at least one rod and adapted to engage with the support system.

4. The heat pump system as claimed in claim 1 wherein the core or housing surface comprises at least one of plate/crenelated/roughness/screwthread/sawtooth shaped material.

5. The heat pump system as claimed in claim 1 wherein the support system comprises the plurality of supports configured to engage the material at a plurality of points and dimensioned to generate turbulence in the fluid during use.

6. The heat pump system as claimed in claim 1 wherein the support system comprises the plurality of supports and a turbulence generator.

7. The heat pump system as claimed in claim 1 wherein a plurality of elements are positioned on an internal surface of the housing.

8. The heat pump system as claimed in claim 1 wherein a plurality of elements are positioned on the outside surface of the core.

9. The heat pump system as claimed in claim 1 wherein the core comprises a hollow core and a plurality of elements are positioned on the inside surface of the hollow core.

10. The heat pump system as claimed in claim 1 wherein the element comprises a spring or helical coil element.

11. A cooling/refrigeration system comprising:
a Shape-Memory Alloy (SMA) or Negative Thermal Expansion (NTE) or elastocaloric material core positioned in a housing and adapted to absorb thermal heat and store energy in response to a first fluid inputted at a first temperature;
the housing is configured to receive the fluid at the first temperature via an inlet to cause the SMA or NTE or elastocaloric material core to change state;
a device is configured to apply stress on the SMA or NTE or elastocaloric core in the housing to cause the SMA or NTE or elastocaloric core to change state; and
a support system is configured to engage with the material in the core to prevent the material buckling when the stress is applied wherein the support system comprises a series of buckling supports positioned along at least one length of the SMA or NTE or elastocaloric material core.

* * * * *